(12) United States Patent
Wu et al.

(10) Patent No.: US 6,381,607 B1
(45) Date of Patent: Apr. 30, 2002

(54) SYSTEM OF ORGANIZING CATALOG DATA FOR SEARCHING AND RETRIEVAL

(75) Inventors: Horng Jyh Paul Wu; Ho Chung Lui; Tian Lin, all of Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/463,378

(22) PCT Filed: Jun. 19, 1999

(86) PCT No.: PCT/SG99/00059

§ 371 Date: Jan. 25, 2000

§ 102(e) Date: Jan. 25, 2000

(87) PCT Pub. No.: WO00/79379

PCT Pub. Date: Dec. 28, 2000

(51) Int. Cl.[7] ............................................... G06F 17/30
(52) U.S. Cl. .......................... 707/100; 707/3; 707/10; 707/500; 709/201; 709/315
(58) Field of Search ............................. 707/1, 3, 5, 10, 707/100, 500, 102, 104.1, 200; 704/1, 9; 709/315, 201, 216, 220, 223

(56) References Cited

U.S. PATENT DOCUMENTS

| | | | | |
|---|---|---|---|---|
| 4,945,475 A | | 7/1990 | Bruffey | 707/1 |
| 5,261,087 A | * | 11/1993 | Mukaino | 707/104.1 |
| 5,295,261 A | | 3/1994 | Simonetti | 707/2 |
| 5,307,486 A | | 4/1994 | Nakamigawa | 707/2 |
| 5,369,763 A | * | 11/1994 | Biles | 707/3 |
| 5,459,861 A | * | 10/1995 | Oda | 707/2 |
| 5,488,717 A | | 1/1996 | Gibson et al. | 707/2 |
| 5,630,125 A | * | 5/1997 | Zellweger | 707/102 |
| 5,640,551 A | | 6/1997 | Chu et al. | 707/5 |
| 5,740,425 A | * | 4/1998 | Povilus | 704/1 |
| 5,838,965 A | * | 11/1998 | Kavanagh et al. | 707/103 R |
| 5,873,087 A | | 2/1999 | Brosda et al. | 707/100 |
| 6,026,409 A | * | 2/2000 | Blumenthal | 345/589 |
| 6,061,692 A | * | 5/2000 | Thomas et al. | 707/10 |
| 6,076,091 A | * | 6/2000 | Fohn et al. | 707/102 |
| 6,257,774 B1 | * | 7/2001 | Stack | 717/5 |
| 6,324,534 B1 | * | 11/2001 | Neal et al. | 706/12 |

FOREIGN PATENT DOCUMENTS

| | | | | |
|---|---|---|---|---|
| EP | | 0114221 | 8/1984 | |
| JP | | 401032345 A | * 7/1987 | G06F/11/22 |

OTHER PUBLICATIONS

Song, Seok–II et al., "An Efficient Concurrency Control Allgorithm for High–Dimensional Index Structures", Proceeding of the International Conference on Information Intelligence and Systems, Oct. 31, —Nov. 3, 1999, pp.504–509.*

* cited by examiner

*Primary Examiner*—Hosain T. Alam
*Assistant Examiner*—Shahid Alam
(74) *Attorney, Agent, or Firm*—Ladas & Parry (57) ABSTRACT

A method, an apparatus, and a computer program product for organizing and searching catalogs based on compacting a hierarchical structure (150, 500) into related arrays (210, 310, 410, 610; and 220, 320, 420, 620) are disclosed. This involves the steps of: storing indices (1–9) according to categories and subcategories in an array of indices (310), storing the keys (S54–S48) according to the categories and subcategories in an array (320) of keys, and linking each index of the array (310) of indices with one or more corresponding keys of the array (320) of keys corresponding to the category or subcategory associated with the index. The indices of a category or subcategory are stored contiguously in the array (310). Each index has one or more pointers recording the interrelationship of the indices. The keys of a given index are also stored contiguously with keys of any indices at the same corresponding category or subcategory level.

48 Claims, 5 Drawing Sheets

| KEY | COUNTRY | STATE | CITY | NAME | INCOME |
|---|---|---|---|---|---|
| S45 | US | CA | LA | Wu | 1200 |
| S46 | US | CA | NIL | Tan | 1300 |
| S47 | CANADA | BC | VC | Chen | 1120 |
| S48 | CANADA | BC | IV | Smith | 1030 |
| S49 | US | CA | LA | Lebrun | 1180 |
| S50 | US | CA | SF | Suzuki | 1490 |
| S51 | CANADA | BC | NIL | Lee | 1309 |
| S52 | CANADA | NIL | NIL | Chien | 1300 |
| S53 | US | CA | LA | Lucas | 2010 |
| S54 | US | NIL | NIL | Lam | 1765 |
| S55 | CANADA | BC | VC | Ivy | 1997 |

SYSTEM OF ORGANIZING CATALOG DATA FOR SEARCHING AND RETRIEVAL

FIELD OF THE INVENTION

The present invention relates to the field of databases and data warehousing, and in particular to a system for searching and retrieving information from catalogs.

BACKGROUND

The widespread advent of the Internet is well known, with individuals and businesses using the Internet as a new media of exchange. Increasingly electronic commerce, or e-commerce, is becoming widely accepted. In e-commerce applications, sellers often put descriptions of their product on a web site. Further, to better publish a product line, a seller typically arranges products into a "catalog", intending to facilitate buyers finding the products that the buyers want. Examples of marketing products for building catalog applications are Intershop, iCat and Open Market.

Many buyers are not, however, well versed in how sellers categorize their products (e.g., the particular name associated with a category of goods, etc.). Therefore, contrary to the intended purpose of a catalog, a catalog regularly creates confusion and is difficult to use for ordinary buyers. This can result in frustration on the buyer's part and loss of revenue on the seller's part.

Figure 1A:
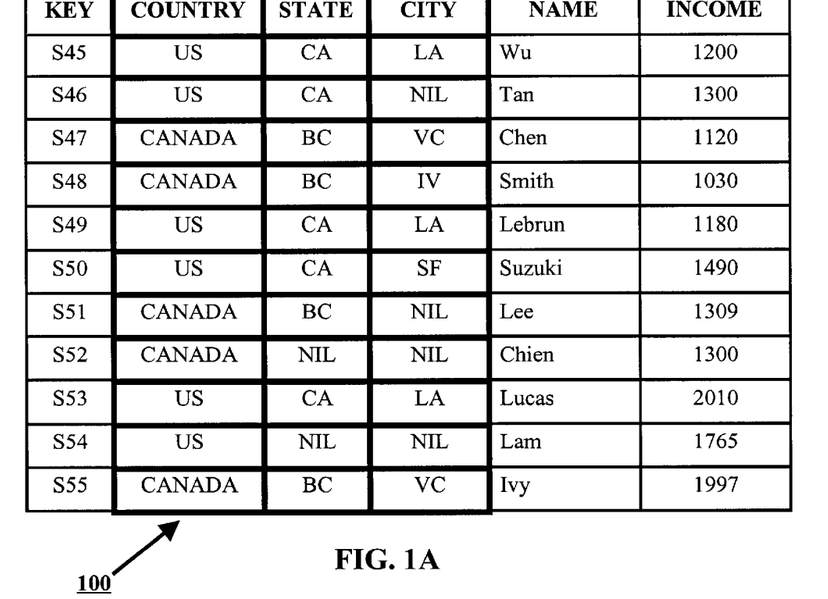
FIG. 1A is a table 100 of a conventional relational database.

The difficulty arises in existing methods due to the B-tree like indexing schemes used in many ordinary databases. The B-tree indexing scheme is used to save space and time in searching and navigating a hierarchical data structure. This can be visualized by considering FIGS. 1A and 1B. FIG. 1A is a block diagram illustrating a table 100 of a relational database. The table 100 has six columns labeled Key, Country, State, City, Name and Income. Each of the keys S45 to S55 is associated with a different person and that person's data. In addition to the person's name, their income and residence (country, state, and city) are given in fields in each row. Thus, the first row having the Key S45 is for "Wu" and has entries of US, CA (California) and LA (Los Angeles) for the country, state and city fields, respectively. The last column "Income" has an entry of 1200. The fields in the three columns Country, State and City are highlighted with thicker borders to point out that the values of the fields are repetitive in terms of information content. For example, the entries "US" and "Canada" appear several times under the Country column.

Figure 1B:
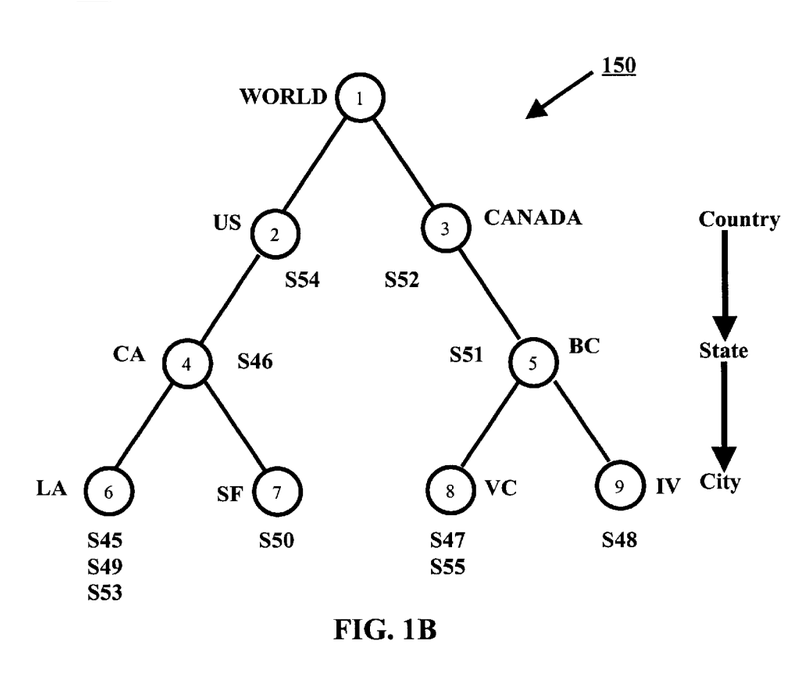
FIG. 1B is a diagram depicting a conventional B-tree representation 150 depicting the linked-record structure of the table 100 of FIG. 1A.

FIG. 1B is a B-tree representation 150 of the entries in the columns Country, State and City and the corresponding Keys, which seeks to reduce the redundancy of the table 100. The tree 150 contains nine nodes numbered 1 to 9. The first node is for the world. The second and third nodes depending from the first node are US and CANADA (CA). This results in a significant compaction of the data contained in the Country column of table 100. Corresponding to these two nodes are Keys S54 and S52, respectively, since the State and City fields in table 100 are "Nil" for these two keys. The fourth node CA depends from the second node for the US. Likewise, BC (British Columbia) depends from the third node for Canada. The fourth and fifth nodes have corresponding Keys S46 and S51, respectively, since the corresponding City field entries are "Nil" for these keys. The sixth and seventh nodes for LA and SF (San Francisco) depend from the fourth node for CA. The sixth node has corresponding Keys S45, S49, and S53. The seventh node has Key S50. Finally, the eighth and ninth nodes VC (Vancouver) and IV depend from the fifth node BC. The eighth node has Keys S47 and S55, and the ninth node has Key S48.

Again, the tree representation 150 of the indices is more compact for storage than the database structure shown in the first four columns of table 100. However, conventional methods are disadvantageous in that they do not specify how indices and keys can be compacted for faster access of keys. Consequently, Keys such as S54 and S52 corresponding to nodes 2 and 3 of FIG. 1B are not contiguously stored; this similarly applies to other subgroups of Keys, such as the group consisting of S45, S49, S53, in relation to Key S50. For example, if Keys S45, S49, and S53 are stored on a disk storage medium at a discontinuous position for S50, a read latency occurs after Key S53 is read to obtain Key S50. This can result in significant degradation of the performance of accessing Keys in the database or catalog. Therefore, due to the randomness in the key/index organization, the speed of retrieval processing is substantially degraded, because (1) each successive traversal along the tree nodes of FIG. 1B and (2) each retrieval of groups of keys incurs latencies for setting up a disk scan due to the storage randomness.

Therefore, a need clearly exists for an improved system of organizing keys and indices to facilitate better retrieval of information from a catalog, especially a system that can use rough and ambiguous user input.

SUMMARY

In accordance with a first aspect of the invention, there is disclosed a method of organizing indices and keys of a tree-like data structure for electronic catalog searching and retrieval. The method including the steps of: storing indices according to categories and subcategories in an array of indices, wherein indices of a category or subcategory are stored contiguously in the array, each index having one or more means for linking the index with a subordinate intermediate index or a leaf index, so as to record the interrelationship of the indices in the tree-like data structure; storing the keys according to the categories and subcategories in an array of keys, wherein keys of a given index are stored contiguously with keys of any indices at the same corresponding category or subcategory level and keys of any subordinate subcategories within a category or subcategory are stored hierarchically in the array of keys; and linking each index of the array of indices with one or more corresponding keys of the array of keys corresponding to the category or subcategory associated with the index.

Preferably, the method includes the step of naming each subcategory according to one or more indices corresponding to the category or subcategory to provide a named path. The method may also include the step of searching a category or subcategory of keys using a named path.

Preferably, each index of the array of indices is linked with one or more corresponding keys of the array of keys corresponding to a category or subcategory associated with the index.

Optionally, the method further includes the step of adding at least one alternative view path to the tree-like data structure, including at least one additional node. The method may further include the step of generating at least one equivalent named path for an existing named path of a category or subcategory. The method may also include the step of adding one or more additional indices to the array of indices corresponding to the alternative view path. Still further, the method may further include the step of adding one or more additional keys to the array of indices corresponding to the alternative view path.

In accordance with a second aspect of the invention, there is disclosed an apparatus for organizing indices and keys of a tree-like data structure for electronic catalog searching and retrieval. The apparatus includes: a device for storing indices according to categories and subcategories in an array of indices, wherein indices of a category or subcategory are stored contiguously in the array, each index having one or more means for linking the index with a subordinate intermediate index or a leaf index, so as to record the interrelationship of the indices in the tree-like data structure; a device for storing the keys according to the categories and subcategories in an array of keys, wherein keys of a given index are stored contiguously with keys of any indices at the same corresponding category or subcategory level and keys of any subordinate subcategories within a category or subcategory are stored hierarchically in the array of keys; and a device for linking each index of the array of indices with one or more corresponding keys of the array of keys corresponding to the category or subcategory associated with the index.

In accordance with a third aspect of the invention, there is disclosed a computer program product having a computer readable medium having a computer program recorded therein for organizing indices and keys of a tree-like data structure for electronic catalog searching and retrieval. The computer program product includes: a module for storing indices according to categories and subcategories in an array of indices, wherein indices of a category or subcategory are stored contiguously in the array, each index having one or more means for linking the index with a subordinate intermediate index or a leaf index, so as to record the interrelationship of the indices in the tree-like data structure; a module for storing the keys according to the categories and subcategories in an array of keys, wherein keys of a given index are stored contiguously with keys of any indices at the same corresponding category or subcategory level and keys of any subordinate subcategories within a category or subcategory are stored hierarchically in the array of keys; and a module for linking each index of the array of indices with one or more corresponding keys of the array of keys corresponding to the category or subcategory associated with the index.

In accordance with a fourth aspect of the invention, there is disclosed a method of organizing indices and keys of a tree-like data structure for electronic catalog searching and retrieval. The method includes the steps of: storing indices according to sibling categories and subcategories in an array of indices, wherein indices of a sibling category or subcategory are stored contiguously in the array, each index having one or more means for linking the index with a subordinate intermediate index or a leaf index, so as to record the interrelationship of the indices in the tree-like data structure; storing the keys according to the sibling categories and subcategories in an array of keys, wherein keys of a given index are stored contiguously with keys of any indices at the same corresponding sibling category or subcategory level; linking each index of the array of indices with one or more corresponding keys of the array of keys corresponding to the sibling category or subcategory associated with the index.

Preferably, the method further includes the step of naming each subcategory according to one or more indices corresponding to the sibling category or subcategory to provide a named path.

Preferably, the method further includes the step of searching a sibling category or subcategory of keys using a named path.

Preferably, each index of the array of indices is linked with one or more corresponding keys of the array of keys corresponding to a sibling category or subcategory associated with the index.

Preferably, the method further includes the step of adding at least one alternative view path to the tree-like data structure, including at least one additional node. Further, the method may include the step of generating at least one equivalent named path for an existing named path of a sibling category or subcategory. Still further, the method may include the step of adding one or more additional indices to the array of indices corresponding to the alternative view path. The method may also include the step of adding one or more additional keys to the array of indices corresponding to the alternative view path.

In accordance with a fifth aspect of the invention, there is disclosed an apparatus for organizing indices and keys of a tree-like data structure for electronic catalog searching and retrieval. The apparatus includes: a device for storing indices according to sibling categories and subcategories in an array of indices, wherein indices of a sibling category or subcategory are stored contiguously in the array, each index having one or more means for linking the index with a subordinate intermediate index or a leaf index, so as to record the interrelationship of the indices in the tree-like data structure; a device for storing the keys according to the sibling categories and subcategories in an array of keys, wherein keys of a given index are stored contiguously with keys of any indices at the same corresponding sibling category or subcategory level; and a device for linking each index of the array of indices with one or more corresponding keys of the array of keys corresponding to the sibling category or subcategory associated with the index.

In accordance with a sixth aspect of the invention, there is disclosed a computer program product having a computer readable medium having a computer program recorded therein for organizing indices and keys of a tree-like data structure for electronic catalog searching and retrieval. The computer program product includes: a module for storing indices according to sibling categories and subcategories in an array of indices, wherein indices of a sibling category or subcategory are stored contiguously in the array, each index having one or more means for linking the index with a subordinate intermediate index or a leaf index, so as to record the interrelationship of the indices in the tree-like data structure; a module for storing the keys according to the sibling categories and subcategories in an array of keys, wherein keys of a given index are stored contiguously with-keys of any indices at the same corresponding sibling category or subcategory level; and a module for linking each index of the array of indices with one or more corresponding keys of the array of keys corresponding to the sibling category or subcategory associated with the index.

BRIEF DESCRIPTION OF THE DRAWINGS

A small number of embodiments of the invention are described hereinafter with reference to the drawings, in which.

DETAILED DESCRIPTION

A method, an apparatus, and a computer program product for organizing and searching catalogs based on compacting a hierarchical structure into related arrays are described. In particular, the related arrays allow fast and "fuzzy" searches, as well as alternative accessing paths to categories in a catalog. In the following description, numerous details are set forth including specific tables of relational databases, data types, and the like, for example. It will be apparent to one skilled in the art, however, that the present invention may be practiced without these specific details. In other instances, well-known features are not described in detail so as not to obscure the present invention.

In the following description, components of the system can be implemented as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Generally speaking, a data structure is a fundamental building block of computer software and computers. A data structure is an organizational scheme applied to data so that the data can be interpreted and so that specific operations can be performed on that data.

The embodiments of the invention seek to provide a more intuitive, flexible, and faster way for people to search items from a catalog. This is achieved by providing a data structure that organizes indices in compressed forms to improve navigation and searching of catalogs. The embodiments work not only on the hierarchical tree structure, but can also be extended to lattice structures. Unlike a tree where a node (and therefore keys) can only be reached by one perspective, the embodiments permit a category in the catalog to be reached from alternative or different perspectives. That is, the embodiments provide a fast and effective searching mechanism that allows alternative accessing paths.

In particular, the embodiments arrange indices of a catalog into specific arrays that permit faster category (node) related retrieval. Further, keys of the catalog are arranged into specific arrays that permit faster category-related retrieval. Still further, the embodiments provide mechanisms for modifying indices to allow alternative viewing while maintaining the same speed and flexibility in category-related retrieval. This is advantageous because the dispersed indices, as well as keys, can be re-arranged into compact arrays. In doing so, "fuzzy" category searches, such as subcategory and sibling-category searches, can be effectively and rapidly carried out. These and other aspects and advantages of the embodiments will be apparent from the description of the embodiments hereinafter.

First Embodiment

Figures 2, 3:
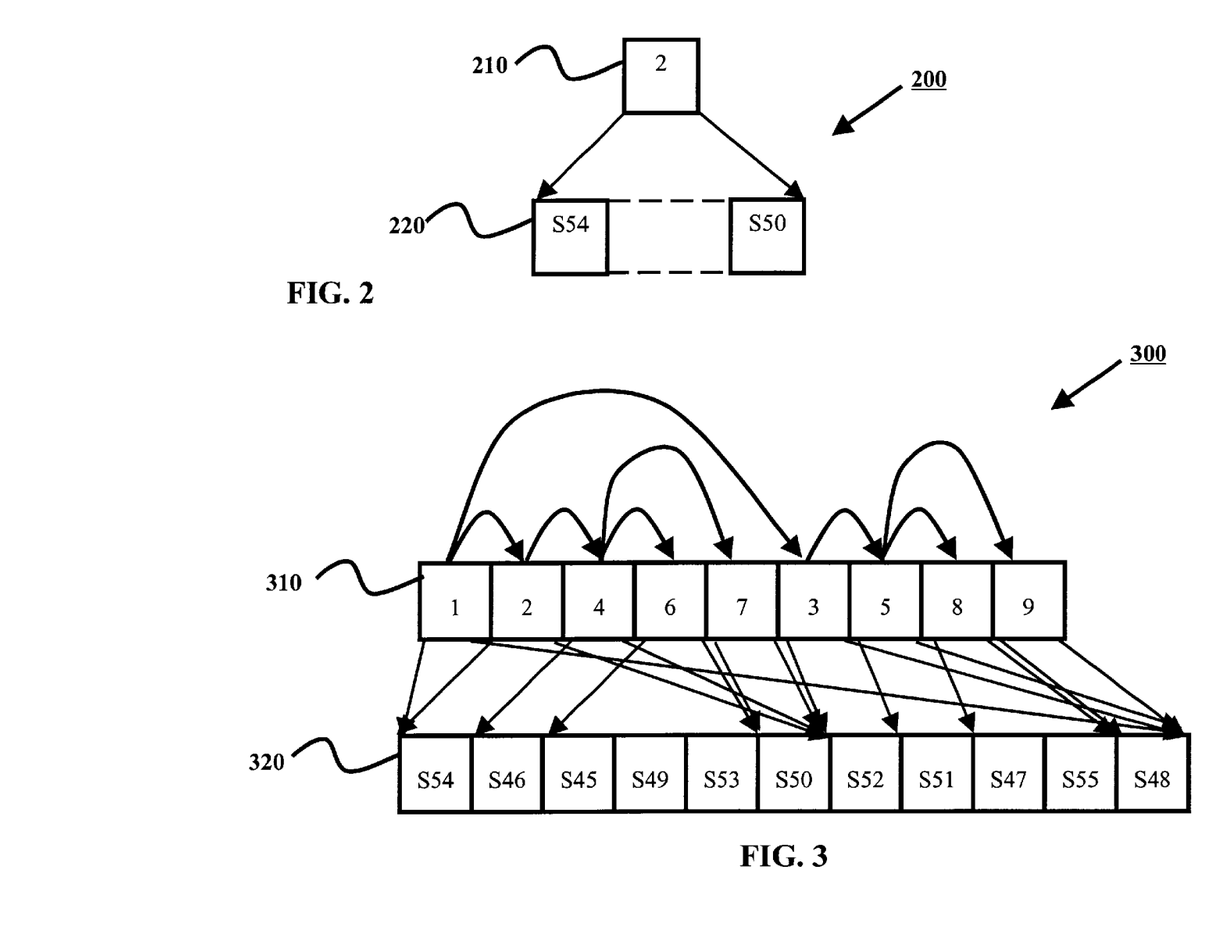
FIG. 2 is a block diagram of an arrangement of indices and keys for subcategory retrieval according to a first embodiment of the invention.
FIG. 3 is a block diagram of an arrangement of indices and keys according to the first embodiment, whereby a key array is accessed from an index array based on optimized subcategory retrieval.

FIGS. 2 and 3 illustrate an arrangement of indices and keys of related records organized in two related arrays for faster subcategory searching in accordance with a first embodiment of the invention.

FIG. 2 illustrates an arrangement 200 between an array 210 containing a single index 2 and an array 220 of keys containing S54, S46, S45, S49, S53 and S50 (keys S46, S45, S49 and S53 are not shown) of FIG. 1A. The single index 2 is linked to the relevant portion of keys in the array 220 of keys by beginning and ending pointers or links pointing to the beginning and ending position of the key array 220. Accordingly, the index 2 is linked to key S54 and key S50 as beginning and ending positions of the subcategory, respectively. From index 2, the beginning and ending positions of the key array 220, sharing the same viewing path of "US", can be identified. The beginning position S54 and the ending position S50 of the key array 220 share the same viewing path leading to index 2. That is, the consecutive elements of the array 220 from S54 to S50, including S54, S46, S45, S49, S53 and S50, are keys belonging to the category of US (the entire set of locations located in US).

By applying the same principle as depicted in FIG. 2, the entire database can be arranged as two related arrays 310 and 320 as depicted in FIG. 3. The index array 310 contains the indices of tree 150 in the following sequence: 1, 2, 4, 6, 7, 3, 5, 8 and 9. The indices are stored contiguously according to categories and subcategories in the array 310. Roughly, a category or subcategory is a branch of the tree structure. Thus the left branch or subcategory containing nodes 2, 4, 6, 7 are stored adjacently. Likewise, the right subcategory or branch containing nodes 3, 5, 8, and 9 are stored in the array in a similar manner. Thus, within a given subcategory (and other subordinate branches), indices are stored near one another according to the branch in a drill down manner from left to right. All indices or nodes of the tree 150 have one or more pointers or links for linking to subordinate indices, if any, embodying the tree structure of FIG. 1B. For example, index 1 (world or universe) has separate pointers pointing to indices 2 and 3 (US and Canada) in accordance with tree 150. The leaf indices or nodes (e.g., 6, 7, 8 and 9) of the tree 150 are not linked to any other indices in the array 310.

The key array 320 contains the keys of the tree 150 arranged in the following sequence: S54, S46, S45, S49, S53, S50, S52, S51, S47, S55 and S48. The key array 320 stores the keys contiguously according to the categories and subcategories. In particular, the keys of a given index are stored contiguously with keys of any indices at the same corresponding category or subcategory level. Also, keys of any subordinate subcategories within a category or subcategory are stored as a group hierarchically in the key array 320. For example, the subcategory US includes keys S54, S46, S45, S49, S53, and S50. These keys are stored contiguously in the array. Likewise, the subcategory BC (node 5) has keys S51, S47, S55 and S48, which are stored contiguously in the key array 320. In turn, each index of the index array 310 is linked with one or more corresponding keys of the key array 320 dependent upon the category or subcategory associated with the index. Thus, for example, index 1 has pointers to the beginning and ending positions, S54 and S48, of the key array 320 in accordance with the World category. Further, the index 5 has beginning and ending links to the beginning and ending keys, S51 and S 48, for the BC subcategory. In this manner, the togetherness of indices and keys are reserved at each level.

Based on these related arrays 310 and 320 (or 210 and 220), a subcategory naming system can be applied. Given that the entire database of persons forms a universal category (World), the subcategory of persons living in US can be named "12", indicating the link or path from index 1 to index 2. The subcategory of persons living in CANADA can be named "13". Likewise, the names of Canada (CA) and Los Angeles (LA) are "124" and "1246", respectively. The remaining subcategories can be named accordingly. These "named paths" (such as "13" and "124") can be used to denote a unique subcategory of keys. Thus, a search of any subcategory of keys can be done through a "named path" in constant time. This avoids many of the latencies that would otherwise be incurred without such related arrays 310 and 320 facilitating this particular type of category search.

Figure 4:
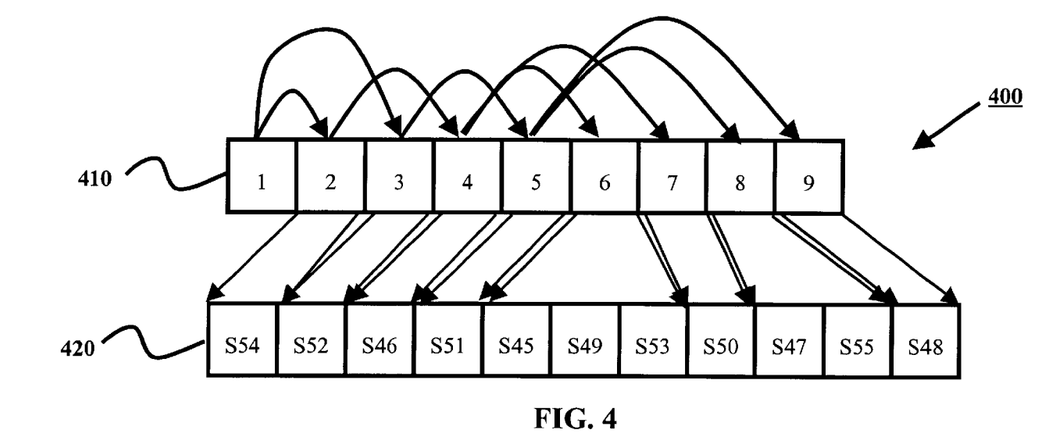
FIG. 4 is a block diagram of an arrangement of indices and keys according to the first embodiment, whereby a key array is accessed from an index array based on an optimized sibling category retrieval.

The embodiments of the invention are not limited to only one type of array compacting method. FIG. 4 is a diagram of two related arrays 410 and 420 for an optimized sibling category search using a different compacting method bringing together related indices and keys. For example, such a search might be used to find all cities in California (CA). The key array 420 can be accessed from the index array 410 based on optimized sibling category retrieval.

The index array 410 contains the indices of tree 150 in the following sequence: 1, 2, 3, 4, 5, 6, 7, 8, 9. The indices are stored contiguously according to levels across the tree 150 proceeding from top to bottom. The first node of the index array 410 points to the second and third nodes or indices, which are stored adjacently. In turn, the third node points to the fifth node. The fourth index points to the sixth and seventh indices; the fifth index points to the eighth and ninth indices.

The key array 420 contains the keys of the tree 150 arranged in the following sequence: S54, S52, S46, S51, S45, S49, S53, S50, S47, S55 and S48. The key array 420 stores the keys contiguously according to the sibling levels across the tree 150. In particular, the key(s) of a given index are stored contiguously with keys of any indices at the same sibling level. The keys of the next (subordinate) sibling level are stored contiguously in his manner beside those of the current (or superior) sibling level.

Each index of the index array 410 is linked the corresponding keys in the key array 420 for that particular index. Thus, for example, there is no key associated key for the first index. The second index points to key S54. Similarly, index 6 has a beginning position indicating key S45 and an ending position indicating key S53 (where keys S45, S49 and S53 are the three keys associated with index 6 in FIG. 1B). Again, this arrangement 400 of two related arrays 410 and 420 has the advantages mentioned hereinbefore.

The index array 410 demonstrates a named path such as "12" for US, which can be used to access keys S54 and S52. These two keys are the records pertaining to two personal records known to be located at the sibling level of the US. The procedure to do this is by shortening the named path of US by one letter, resulting in "1", and use the named path to access index 2 and 3. For the beginning position of index 2 and the ending position of index 3, all the personal records of who resides in the US, but do not have particular states and cities, can be accessed, namely S54 and S52.

Second Embodiment

A second embodiment of the invention is described hereinafter with reference to FIGS. 5 and 6. In e-commerce, it may be desirable to access a category through an alternative view path.

Figure 5:
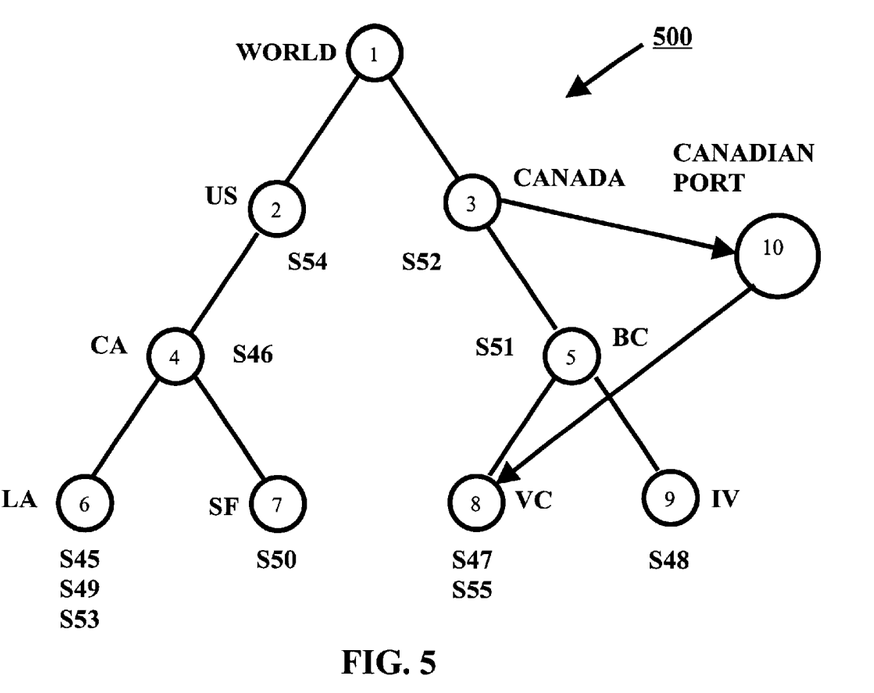
FIG. 5 is a diagram depicting a B-tree representation 500 of a portion of the table 100 of FIG. 1A using an alternative view path according to a second embodiment of the invention.

FIG. 5 is a diagram of a modified tree 500 containing an alternative view path to that of the tree 150 in FIG. 1B. The modified tree 500 is identical to the tree 150 in FIG. 1B except that a new node or index 10 labelled "Canadian Port" is added. A path extends from node 3 (CANADA) to node 10 and from there to node 8 (VC). Thus, for example, a city "Vancouver" (VC) indicated by index 8 may be better known as the category "Canadian Port" denoted by index 10, the alternative view node. In terms of hierarchical structure, the alternative view node 10 can be accommodated quite easily.

Basically, index or node 10 is added by having some additional pointers link node 10 to its super-node and sub-node in the original hierarchical tree structure 150. By doing so, the array system provides an effective way to accommodate alternative view paths while maintaining the same accessing speed and flexibility that is available in the array system.

A table can be constructed of equivalent "named paths". For example, the named path "1, 3, 10, 8" can be made equivalent to "1, 3, 5, 8". Thus, when "Canadian Port" is used in a subcategory search, the named path "1, 3, 5, 8" is retrieved based on the fact that node 10 is an alternative node and the named path "1, 3, 5, 8" is a named path in the original tree equivalent to "1, 3, 10, 8". The foregoing applies when an alternative view path is introduced on-the-fly. However, the use of an equivalent table (this may introduce some overhead) can be avoided by compacting the index and key arrays by adding some duplicate indices and keys, respectively. This compacting of indices and keys is depicted in FIG. 6.

Figure 6:
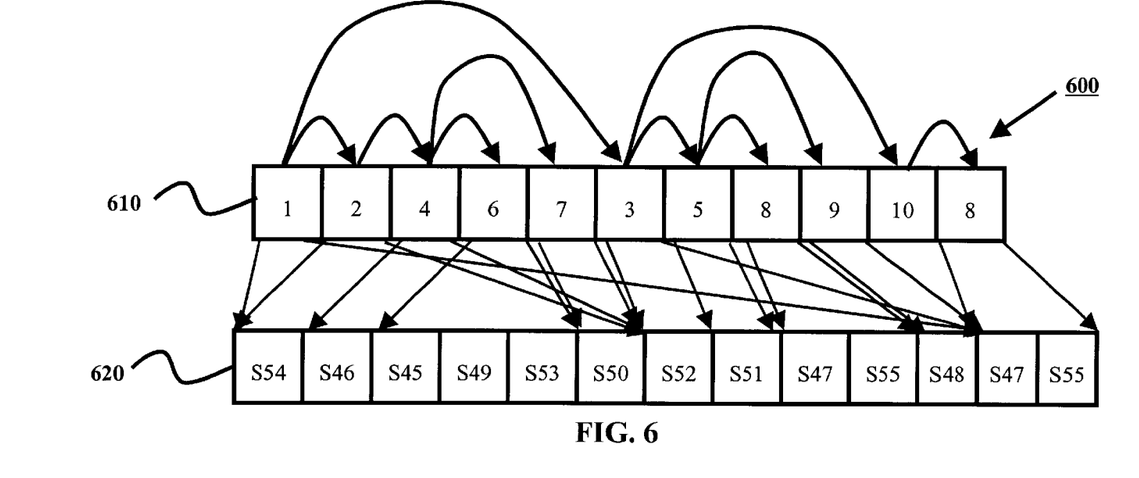
FIG. 6 is a block diagram of an arrangement of indices and keys according to the second embodiment, whereby a modified key array is accessed from an index array based on optimized subcategory retrieval catering for the alternative view path.

FIG. 6 depicts the corresponding arrangement 600 adapted to incorporate this alternative view node in accordance with a second embodiment of the invention. The index array 610 is substantially the same as that as index array 310 of FIG. 3. However, two new indices 10 and 8 have been added at the end. Also, index 3 is modified to point to index 10 and in turn index 10 points to the second node numbered 8. Corresponding modifications are incorporated in key array 620 (related to array 320 in FIG. 3). Another set of keys S47 and S55 are added after key S48. Index 10 of the index array 610 does not have any links to keys in the key array 620, but the second node 8 points to the second set of keys S47 and S55 of the key array 620. In view of the foregoing disclosure, alternative viewing paths can be readily applied to the arrangement of arrays for sibling category retrieval as well (not shown).

Figure 7:
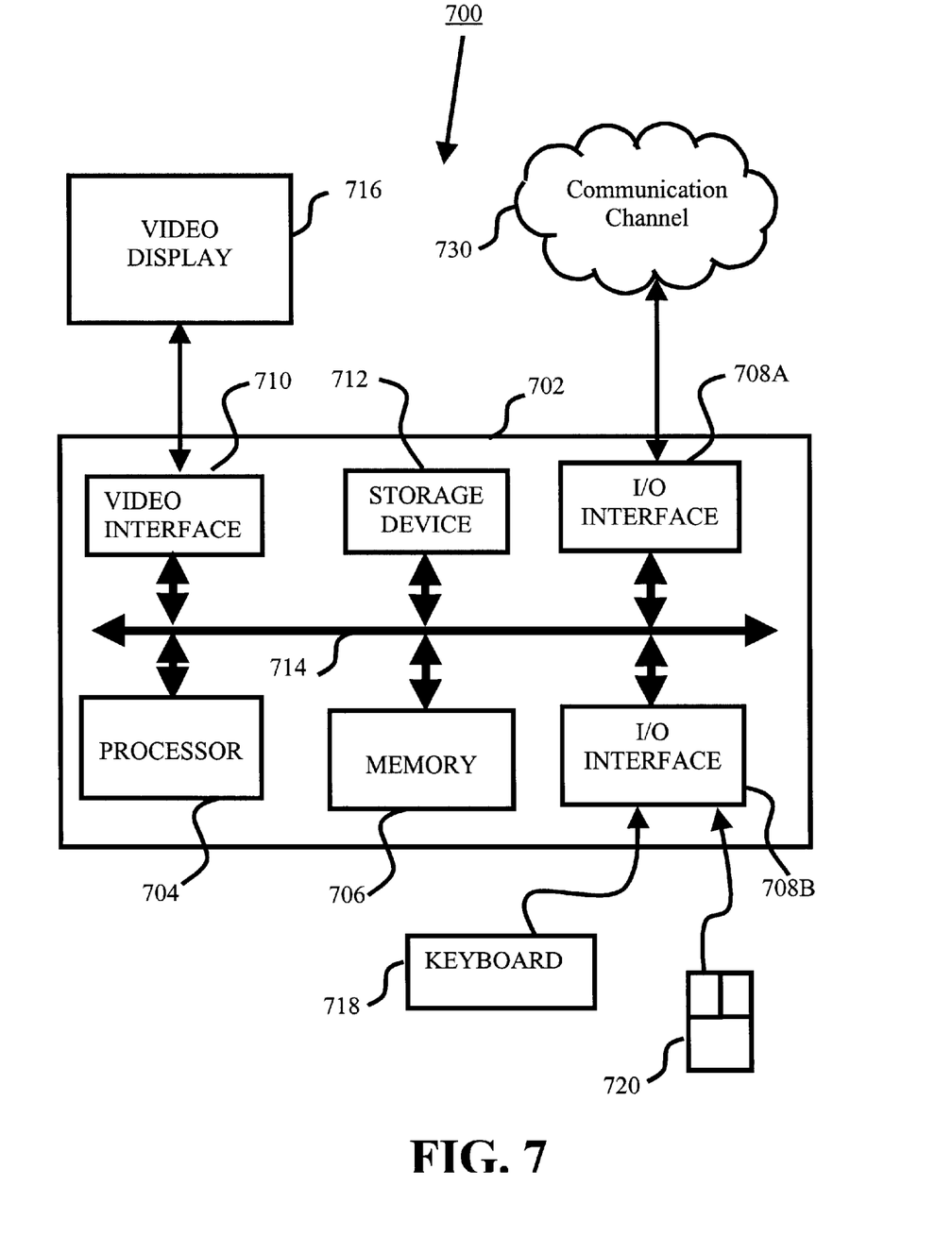
FIG. 7 is a block diagram of a general-purpose computer with which the embodiments of the invention can be practiced.

The embodiments of the invention are preferably implemented using a computer, such as the general-purpose computer shown in FIG. 7. In particular, the process of implementing the arrangement of related arrays in FIGS. 2 to 6 can be implemented in software, or a computer program, executing on the computer. The method or process steps to implement the embodiments can be effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects an advantageous apparatus for organizing and searching catalogs based on compacting a hierarchical structure into related arrays to facilitate subcategory and sibling category searches and retrieval in accordance with the embodiments of the invention.

The computer system 700 consists of the computer 702, a video display 716, and input devices 718, 720. In addition, the computer system 700 can have any of a number of other output devices including line printers, laser printers, plotters, and other reproduction devices connected to the computer 702. The computer system 700 can be connected to one or more other computers via a communication interface 708*b* using an appropriate communication channel 730 such as a modem communications path, a computer network, or the like. The computer network may include a local area network (LAN), a wide area network (WAN), an Intranet, and/or the Internet.

The computer 702 itself consists of a central processing unit(s) (simply referred to as a processor hereinafter) 704, a memory 706 which may include random access memory (RAM) and read-only memory (ROM), input/output (IO) interfaces 708*a* and 708*b*, a video interface 710, and one or more storage devices generally represented by a block 712 in FIG. 7. The storage device(s) 712 can consist of one or more of the following: a floppy disc, a hard disc drive, a magneto-optical disc drive, CD-ROM, magnetic tape or any other of a number of non-volatile storage devices well known to those skilled in the art. Each of the components 704 to 712 is typically connected to one or more of the other devices via a bus 714 that in turn can consist of data, address, and control buses.

The video interface 710 is connected to the video display 716 and provides video signals from the computer 702 for display on the video display 716. User input to operate the computer 702 can be provided by one or more input devices. For example, an operator can use the keyboard 718 and/or a pointing device such as the mouse 720 to provide input to the computer 702.

The system 700 is simply provided for illustrative purposes and other configurations can be employed without departing from the scope and spirit of the invention. Computers with which the embodiment can be practiced include IBM-PC/ATs or compatibles, one of the Macintosh (TM) family of PCs, Sun Sparcstation (TM), a workstation or the like. The foregoing are merely exemplary of the types of computers with which the embodiments of the invention may be practiced. Typically, the processes of the embodiments, described hereinafter, are resident as software or a program recorded on a hard disk drive (generally depicted as block 712 in FIG. 7) as the computer readable medium, and read and controlled using the processor 704. Intermediate storage of the program and pixel data and any data fetched from the network may be accomplished using the semiconductor memory 706, possibly in concert with the hard disk drive 712.

In some instances, the program may be supplied to the user encoded on a CD-ROM or a floppy disk (both generally depicted by block 712), or alternatively could be read by the user from the network via a modem device connected to the computer, for example. Still further, the software can also be loaded into the computer system 700 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

In the foregoing manner, a method, an apparatus, and a computer program product for organizing and searching catalogs based on compacting a hierarchical structure into related arrays have been disclosed. While only a small number of embodiments are described, it will be apparent to those skilled in the art in view of this disclosure that numerous changes and/or modifications can be made without departing from the scope and spirit of the invention.

What is claimed is:

1. A method of organizing indices and keys of a tree-like data structure for electronic catalog searching and retrieval, said method including the steps of:

storing indices according to categories and subcategories in an array of indices, wherein indices of a category or subcategory are stored contiguously in said array, each index having one or more means for linking said index with a subordinate intermediate index or a leaf index, so as to record the interrelationship of said indices in said tree-like data structure;

storing said keys according to said categories and subcategories in an array of keys, wherein keys of a given index are stored contiguously with keys of any indices at the same corresponding category or subcategory level and keys of any subordinate subcategories within a category or subcategory are stored hierarchically in said array of keys;

linking each index of said array of indices with one or more corresponding keys of said array of keys corresponding to the category or subcategory associated with said index.

2. The method according to claim 1, further including the step of naming each subcategory according to one or more indices corresponding to said category or subcategory to provide a named path.

3. The method according to claim 2, further including the step of searching a category or subcategory of keys using a named path.

4. The method according to claim 1, wherein each index of said array of indices is linked with one or more corresponding keys of said array of keys corresponding to a category or subcategory associated with said index.

5. The method according to claim 1, further including the step of adding at least one alternative view path to said tree-like data structure, including at least one additional node.

6. The method according to claim 5, including the step of generating at least one equivalent named path for an existing named path of a category or subcategory.

7. The method according to claim 6, further including the step of adding one or more additional indices to said array of indices corresponding to said alternative view path.

8. The method according to claim 7, further including the step of adding one or more additional keys to said array of indices corresponding to said alternative view path.

9. An apparatus for organizing indices and keys of a tree-like data structure for electronic catalog searching and retrieval, said apparatus including:

means for storing indices according to categories and subcategories in an array of indices, wherein indices of a category or subcategory are stored contiguously in said array, each index having one or more means for linking said index with a subordinate intermediate index or a leaf index, so as to record the interrelationship of said indices in said tree-like data structure;

means for storing said keys according to said categories and subcategories in an array of keys, wherein keys of a given index are stored contiguously with keys of any indices at the same corresponding category or subcategory level and keys of any subordinate subcategories within a category or subcategory are stored hierarchically in said array of keys; and means for linking each index of said array of indices with one or more corresponding keys of said array of keys corresponding to the category or subcategory associated with said index.

10. The apparatus according to claim 9, further including means for naming each subcategory according to one or more indices corresponding to said category or subcategory to provide a named path.

11. The apparatus according to claim 10, further including means for searching a category or subcategory of keys using a named path.

12. The apparatus according to claim 9, wherein each index of said array of indices is linked with one or more corresponding keys of said array of keys corresponding to a category or subcategory associated with said index.

13. The apparatus according to claim 9, further including means for adding at least one alternative view path to said tree-like data structure, including at least one additional node.

14. The apparatus according to claim 13, including means for generating at least one equivalent named path for an existing named path of a category or subcategory.

15. The apparatus according to claim 14, further including means for adding one or more additional indices to said array of indices corresponding to said alternative view path.

16. The apparatus according to claim 15, further including means for adding one or more additional keys to said array of indices corresponding to said alternative view path.

17. A computer program product having a computer readable medium having a computer program recorded therein for organizing indices and keys of a tree-like data structure for electronic catalog searching and retrieval, said computer program product including:

means for storing indices according to categories and subcategories in an array of indices, wherein indices of a category or subcategory are stored contiguously in said array, each index having one or more means for linking said index with a subordinate intermediate index or a leaf index, so as to record the interrelationship of said indices in said tree-like data structure;

means for storing said keys according to said categories and subcategories in an array of keys, wherein keys of a given index are stored contiguously with keys of any indices at the same corresponding category or subcategory level and keys of any subordinate subcategories within a category or subcategory are stored hierarchically in said array of keys; and means for linking each index of said array of indices with one or more corresponding keys of said array of keys corresponding to the category or subcategory associated with said index.

18. The computer program product according to claim 17, further including means for naming each subcategory according to one or more indices corresponding to said category or subcategory to provide a named path.

19. The computer program product according to claim 18, further including means for searching a category or subcategory of keys using a named path.

20. The computer program product according to claim 17, wherein each index of said array of indices is linked with one or more corresponding keys of said array of keys corresponding to a category or subcategory associated with said index.

21. The computer program product according to claim 17, further including means for adding at least one alternative view path to said tree-like data structure, including at least one additional node.

22. The computer program product according to claim 21, including means for generating at least one equivalent named path for an existing named path of a category or subcategory.

23. The computer program product according to claim 22, further including means for adding one or more additional indices to said array of indices corresponding to said alternative view path.

24. The computer program product according to claim 21, further including means for adding one or more additional keys to said array of indices corresponding to said alternative view path.

25. A method of organizing indices and keys of a tree-like data structure for electronic catalog searching and retrieval, said method including the steps of:

storing indices according to sibling categories and subcategories in an array of indices, wherein indices of a sibling category or subcategory are stored contiguously in said array, each index having one or more means for linking said index with a subordinate intermediate index or a leaf index, so as to record the interrelationship of said indices in said tree-like data structure;

storing said keys according to said sibling categories and subcategories in an array of keys, wherein keys of a given index are stored contiguously with keys of any indices at the same corresponding sibling category or subcategory level;

linking each index of said array of indices with one or more corresponding keys of said array of keys corresponding to the sibling category or subcategory associated with said index.

26. The method according to claim 25, further including the step of naming each subcategory according to one or more indices corresponding to said sibling category or subcategory to provide a named path.

27. The method according to claim 26, further including the step of searching a sibling category or subcategory of keys using a named path.

28. The method according to claim 25, wherein each index of said array of indices is linked with one or more corresponding keys of said array of keys corresponding to a sibling category or subcategory associated with said index.

29. The method according to claim 25, further including the step of adding at least one alternative view path to said tree-like data structure, including at least one additional node.

30. The method according to claim 29, including the step of generating at least one equivalent named path for an existing named path of a sibling category or subcategory.

31. The method according to claim 30, further including the step of adding one or more additional indices to said array of indices corresponding to said alternative view path.

32. The method according to claim 31, further including the step of adding one or more additional keys to said array of indices corresponding to said alternative view path.

33. An apparatus for organizing indices and keys of a tree-like data structure for electronic catalog searching and retrieval, said apparatus including:
- means for storing indices according to sibling categories and subcategories in an array of indices, wherein indices of a sibling category or subcategory are stored contiguously in said array, each index having one or more means for linking said index with a subordinate intermediate index or a leaf index, so as to record the interrelationship of said indices in said tree-like data structure;
- means for storing said keys according to said sibling categories and subcategories in an array of keys, wherein keys of a given index are stored contiguously with keys of any indices at the same corresponding sibling category or subcategory level;
- means for linking each index of said array of indices with one or more corresponding keys of said array of keys corresponding to the sibling category or subcategory associated with said index.

34. The apparatus according to claim 33, further including means for naming each subcategory according to one or more indices corresponding to said sibling category or subcategory to provide a named path.

35. The apparatus according to claim 34, further including means for searching a sibling category or subcategory of keys using a named path.

36. The apparatus according to claim 33, wherein each index of said array of indices is linked with one or more corresponding keys of said array of keys corresponding to a sibling category or subcategory associated with said index.

37. The apparatus according to claim 33, further including means for adding at least one alternative view path to said tree-like data structure, including at least one additional node.

38. The apparatus according to claim 37, including means for generating at least one equivalent named path for an existing named path of a sibling category or subcategory.

39. The apparatus according to claim 38, further including means for adding one or more additional indices to said array of indices corresponding to said alternative view path.

40. The apparatus according to claim 39, further including means for adding one or more additional keys to said array of indices corresponding to said alternative view path.

41. A computer program product having a computer readable medium having a computer program recorded therein for organizing indices and keys of a tree-like data structure for electronic catalog searching and retrieval, said computer program product including:
- means for storing indices according to sibling categories and subcategories in an array of indices, wherein indices of a sibling category or subcategory are stored contiguously in said array, each index having one or more means for linking said index with a subordinate intermediate index or a leaf index, so as to record the interrelationship of said indices in said tree-like data structure;
- means for storing said keys according to said sibling categories and subcategories in an array of keys, wherein keys of a given index are stored contiguously with keys of any indices at the same corresponding sibling category or subcategory level;
- means for linking each index of said array of indices with one or more corresponding keys of said array of keys corresponding to the sibling category or subcategory associated with said index.

42. The computer program product according to claim 41, further including means for naming each subcategory according to one or more indices corresponding to said sibling category or subcategory to provide a named path.

43. The computer program product according to claim 42, further including means for searching a sibling category or subcategory of keys using a named path.

44. The computer program product according to claim 41, wherein each index of said array of indices is linked with one or more corresponding keys of said array of keys corresponding to a sibling category or subcategory associated with said index.

45. The computer program product according to claim 41, further including means for adding at least one alternative view path to said tree-like data structure, including at least one additional node.

46. The computer program product according to claim 45, including means for generating at least one equivalent named path for an existing named path of a sibling category or subcategory.

47. The computer program product according to claim 46, further including means for adding one or more additional indices to said array of indices corresponding to said alternative view path.

48. The apparatus according to claim 47, further including means for adding one or more additional keys to said array of indices corresponding to said alternative view path.

* * * * *